(12) United States Patent
Smith et al.

(10) Patent No.: US 11,183,828 B1
(45) Date of Patent: Nov. 23, 2021

(54) DEVICE WITH HEALTH MONITORING

(71) Applicant: hvGrid-tech Inc., Newmarket (CA)

(72) Inventors: Robert F. Smith, Southbury, CT (US); Charles J. Wills, Monroe, CT (US); Duncan C. Breese, New Milford, CT (US); Jake Gelhard, Hamilton (CA); Kathryn Klement, Newmarket (CA); Stephen Burks, Creemore (CA)

(73) Assignee: hvGrid-tech Inc., NewMarket (CA)

( * ) Notice: Subject to any disclaimer, the term of this patent is extended or adjusted under 35 U.S.C. 154(b) by 0 days.

(21) Appl. No.: 17/323,363

(22) Filed: May 18, 2021

Related U.S. Application Data

(60) Provisional application No. 62/705,146, filed on Jun. 12, 2020.

(51) Int. Cl.
| | |
|---|---|
| *H02G 15/10* | (2006.01) |
| *H02H 9/04* | (2006.01) |
| *G01J 5/10* | (2006.01) |
| *G08B 21/18* | (2006.01) |
| *G01K 1/024* | (2021.01) |
| *G01L 19/08* | (2006.01) |
| *G01K 1/14* | (2021.01) |

(52) U.S. Cl.
CPC ............... *H02G 15/10* (2013.01); *G01J 5/10* (2013.01); *G01K 1/024* (2013.01); *G01K 1/14* (2013.01); *G01L 19/086* (2013.01); *G08B 21/182* (2013.01); *H02H 9/045* (2013.01)

(58) Field of Classification Search
CPC ...... H02G 15/10; G08B 21/182; G01K 1/024; G01K 1/14; G01J 5/10; H02H 9/045; G01L 19/086
See application file for complete search history.

(56) References Cited

U.S. PATENT DOCUMENTS

| | | |
|---|---|---|
| 3,848,224 A | 11/1974 | Olivero |
| 5,357,068 A | 10/1994 | Rozier |
| 5,656,996 A | 8/1997 | Houser |
| 6,410,852 B1 | 6/2002 | Schmpf |

(Continued)

FOREIGN PATENT DOCUMENTS

| | | |
|---|---|---|
| CA | 2741170 | 2/2018 |
| CN | 202737787 | 2/2013 |

(Continued)

OTHER PUBLICATIONS

Ke Zhu, Non-Contact Capacitive-Coupling-Based and Magnetic-Field-Sensing-Assisted Technique for Monitoring Voltage of Overhead Power Transmission Lines, 15 pages, Feb. 4, 2017 (Year: 2017).*

(Continued)

*Primary Examiner* — Tung S Lau
(74) *Attorney, Agent, or Firm* — Haug Partners LLP

(57) ABSTRACT

A device, such as a link box, with health monitoring has a housing defining an interior space, at least one surge arrester positioned in the interior space, at least one contactless temperature sensor positioned to contactlessly measure a temperature of the at least one surge arrester and generate temperature data therefrom, and at least one controller connected to the at least one contactless temperature sensor and configured to receive the temperature data.

29 Claims, 8 Drawing Sheets

(56) References Cited

U.S. PATENT DOCUMENTS

| | | | |
|---|---|---|---|
| 6,593,525 | B1 | 7/2003 | Vanderhoff et al. |
| 8,391,653 | B2 | 3/2013 | Davies et al. |
| 9,146,268 | B2 | 9/2015 | Emanuel et al. |
| 9,455,767 | B2 | 9/2016 | Klapper |
| 10,466,277 | B1 * | 11/2019 | Brooks ............... G01R 19/32 |
| 10,686,308 | B1 * | 6/2020 | Burks ................ G01R 31/66 |
| 2011/0263067 | A1 | 10/2011 | Vaid et al. |
| 2016/0261103 | A1 | 9/2016 | Lallouet et al. |
| 2017/0024026 | A1 | 1/2017 | Suzuki et al. |
| 2017/0205459 | A1 | 7/2017 | De Rai et al. |
| 2018/0326429 | A1 | 11/2018 | Fritzsch et al. |
| 2019/0097408 | A1 | 5/2019 | Czibur et al. |
| 2021/0124327 | A1 * | 4/2021 | Parfitt ................ G08B 17/06 |

FOREIGN PATENT DOCUMENTS

| | | | | |
|---|---|---|---|---|
| CN | 103308832 | | 9/2013 | |
| CN | 103427390 | | 12/2013 | |
| CN | 203522110 | | 4/2014 | |
| CN | 104882851 | | 9/2015 | |
| CN | 205826142 | | 12/2016 | |
| CN | 206773053 | | 12/2017 | |
| CN | 105103205 | B * | 12/2018 | ............ G08B 17/12 |
| CN | 109193548 | | 1/2019 | |
| CN | 209488104 | | 10/2019 | |
| CN | 105310659 | B * | 2/2021 | ............ A61B 5/01 |
| CN | 202443038 | | 9/2021 | |
| CZ | 346792 | A3 * | 6/1994 | ............ G01K 13/04 |
| DE | 102011005943 | * | 9/2012 | ............ B01D 29/21 |
| DE | 102014115074 | A1 * | 4/2016 | ......... G05D 23/1919 |
| DE | 202016000699 | U1 * | 5/2016 | ............ G01N 1/44 |
| GB | 186768 | | 10/1922 | |
| GB | 2556975 | | 6/2018 | |
| JP | H08223718 | | 8/1996 | |
| KR | 100988267 | | 10/2010 | |
| KR | 2014-0128083 | A * | 11/2014 | ......... C23C 16/4586 |
| KR | 2018-0058468 | A * | 1/2018 | ............ G01J 5/20 |
| KR | 20200014183 | | 2/2020 | |
| KR | 102089184 | | 3/2020 | |
| KR | 20200036479 | | 4/2020 | |
| NL | 1000888 | C2 * | 1/1997 | ............ G01K 3/00 |
| SK | 50039-2020 | U1 * | 1/2021 | ............ A61B 5/01 |
| WO | WO 2001/073796 | | 10/2011 | |
| WO | WO 2014/079713 | | 5/2014 | |
| WO | WO 2016/190823 | | 12/2016 | |
| WO | WO 2016/190824 | | 12/2016 | |
| WO | WO 2019/194754 | | 10/2019 | |

OTHER PUBLICATIONS

Li Chen, A silicon carbide capacitive pressure sensor for in-cylinder pressure measurement, Oct. 2, 2007, 7 pages (Year: 2007).*

Kam Chana, Combined Blade Vibration and Surge/Stall Sensor for Gas Turbine Blade Health Management, Aug. 6, 2021, 14 pages (Year: 2021).*

Po-Wei Huang, An Embedded Non-Contact Body Temperature Measurement System with Automatic Face Tracking and Neural Network Regression, Nov. 9, 2016, 6 pages (Year: 2016).*

U.S. Appl. No. 17/320,860, unpublished, Robert F. Smith.

International Search Report and Written opinion for Application No. PCT/CA 2020/050444 dated Jun. 26, 2020.

Donoso et al., REE's Research and Development projects related to predictive maintenance based on monitoring of critical parameters in high voltage underground cables, Jun. 2015.

EMC.22.013-FRP-Link-Box_ p. 1_ Nov. 30, 2018.

EMC.22.014-TRANSPARENT-WINDOW-LINK-BOX_ p. 1_ Nov. 30, 2018.

IP Rating Chart-p. 1-Jun. 6, 2017.

Link Boxes & Bonding Leads For HV Cable Systems_pp. 1-5_Jun. 20, 2018.

Synth & App-of-reactive-stiffening-agent_Mahmoud et al._pp. 119-126_Aug. 2007.

High Voltage Cable Systems—Cables and Accessories up to 500 kV, nkt cables, published as early as Apr. 28, 2016.

High Voltage Cable Accessories 72 kV up to 245 kV, nkt cables, published as early as Nov. 6, 2014.

Fiberglass Reinforced Polyester (FRP) Link Boxes, www.emelec.com.tr, revised Nov. 30, 2018.

Leemans et al "Experience with the commissioning and operation of a monitoring system on a 380 KV cable System in Belgium", C3-3, Jun. 2019.

* cited by examiner

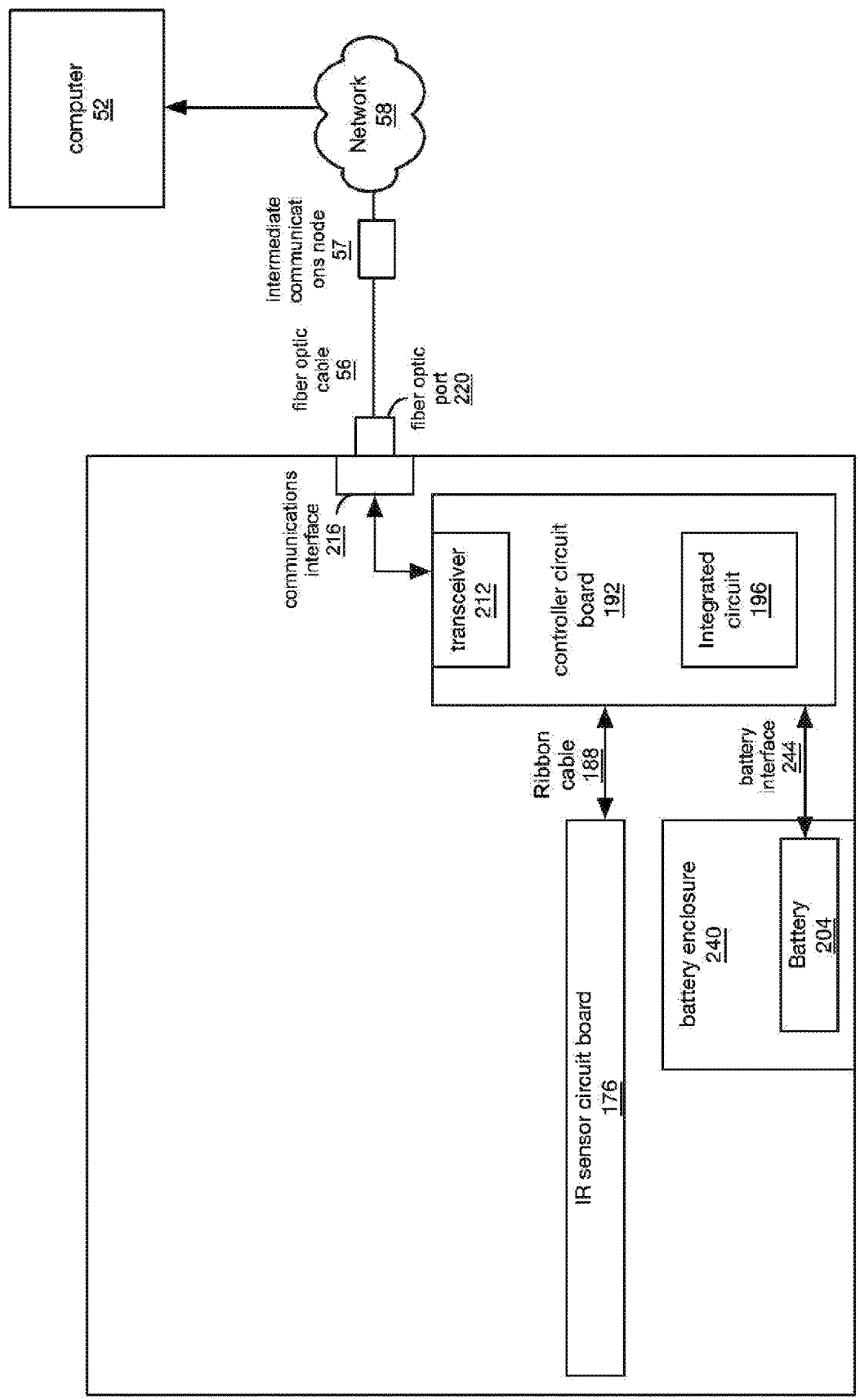

DEVICE WITH HEALTH MONITORING

FIELD OF THE INVENTION

The specification relates generally to electrical apparatuses and, in particular, to a system and method for monitoring the health of a device.

BACKGROUND OF THE INVENTION

Sheath-bonding "link boxes" are used to make bonding connections to the sheaths or shields of high voltage cable systems. A link box provides a watertight enclosure for making connections between sheath-bonding leads and ground, in some cases through surge arresters known as sheath voltage limiters ("SVLs"). The link boxes are frequently installed below ground in manholes or handholes but may also be installed above ground in substations.

Link boxes are connected to medium voltage, high voltage, or extra high voltage circuits and typically located in hard-to-access places such as manholes. Opening the link box for periodic maintenance checks requires the transmission circuit to be de-energized for safety reasons, which requires planning and outage coordination. For link boxes that are in manholes, it also requires the utility to address the safety and traffic concerns associated with confined space manhole entry. As a result, in practice, periodic maintenance checks are rarely practiced. For most utilities, even to enter a manhole requires all circuits in that manhole to be de-energized for safety reasons. Therefore, utilities typically only enter manholes for maintenance every 3 to 5 years or less often. Maintenance of link boxes typically involves their opening and closing, thus increasing the probability of their malfunctioning due to improper resealing. Thus, it can be challenging to proactively avoid issues with such sheath-bonding link boxes, and they are generally operated to the point of failure, which can lead to more consequential failure of the power cable system.

When periodic maintenance is performed on link boxes, it is typically limited to visual inspection for moisture ingress, poor connections, visually damaged SVLs, and other abnormalities. SVLs may be tested or replaced but some utilities find doing so to be cost prohibitive. During periodic maintenance, the link boxes may also be used to check the condition of the cable jacket since they provide a convenient location to electrically isolate the cable sheath from ground and apply a voltage test to the cable jacket and shield breaks.

Since the maintenance checks are infrequent, problems with the link boxes and sheath-bonding system can go undetected for years at a time, the frequency with which these link boxes are typically physically inspected.

To date, however, monitoring of underground cable systems is not common. In order to perform link box monitoring, power needs to be delivered to or derived from the link box. Delivery of such power can be challenging due to the location of the link box when in position underground. Power can be harvested from cables by installing current transformers around the cables, which produce a current proportional to the current flowing in the cable. However, power harvesting has drawbacks and limitations. Power harvesting from the main circuit cables can be costly since the cables can be very large. Power harvesting from the sheath-bonding cables is an attractive option, but the amount of power that can be harvested, and whether any energy can be harvested at all, depends on the current flowing in the sheath-bonding cable, which can vary depending on the system configuration and loading conditions. Power can also be harvested from a voltage potential inside of the link box but the magnitude of the voltage depends on the system configurations and loading conditions. Since the primary purpose of the link box is to reduce currents and potentials that would otherwise be present, harvesting power from the sheath bonding leads may not provide enough power for a reliable link box monitoring system.

Surge arresters protect the electrical system from over-voltage transients by allowing a disproportionate increase in current to flow through them with a relatively small change in voltage across their terminals above a certain voltage threshold, thus preventing the voltage from rising beyond protective values where installed along a protected circuit. For line voltage surge arresters energized at the grid voltage and operating close to their maximum continuous operating voltage ratings, a small but measurable continuous current flows through the arrester to ground. These surge arresters can be monitored using off-the-shelf devices that infer the health of the surge arrester by analyzing the normal current flow and, more specifically, a third harmonic component of the current that can be attributed to the surge arrester conduction characteristics and not the line voltage. These surge arrester monitors may also gather data about the surge arrester operation history such as the number and characteristic of transients conducted by the surge arrester using current and sometimes voltage data.

Although the same varistor technology is used for SVLs used in sheath-bonding link boxes, SVLs are normally energized at voltages well below their maximum continuous operating voltage, for example, tens or hundreds of volts compared with thousands of volts. The resulting current flowing through the arrester is too small to analyze. As such, the surge arrester monitoring equipment used for line voltage arresters is not applicable for SVL condition monitoring applications.

When surge arresters begin to fail, the limiting clamping voltage decreases, resulting in increased conduction of current at progressively lower clamping voltages. As the difference between the operating voltage and the conduction threshold narrows, an increased current is permitted to flow through the arrestor during normal operation causing the surge arrester temperature to rise. Thermograms of line voltage arrestors using handheld general-purpose Infrared ("IR") temperature measuring equipment have been used for many years to identify overheating station equipment including arresters during annual routine maintenance activities. Such equipment is too bulky and expensive to deploy within and adjacent to the SVLs installed in link boxes. Some researchers have proposed to use fiber optics to detect this temperature rise. The challenge with this approach is that it requires the surge arresters to be produced specially with an embedded fiber, which would be costly, or else the fiber needs to be placed in contact with the arrester to be able to detect the temperature of the arrester, which is cumbersome, expensive and can impede visual inspection of the device.

SUMMARY OF THE DISCLOSURE

In an aspect, there is provided a device with health monitoring, comprising: a housing defining an interior space; at least one surge arrester positioned in the interior space; at least one contactless temperature sensor positioned to contactlessly measure a temperature of the at least one surge arrester and generate temperature data therefrom; and at least one controller connected to the at least one contactless temperature sensor and configured to receive the temperature data.

The at least one controller can be provided on at least one circuit board.

At least a portion of the housing can be at least partially transparent, and at least one of the at least one circuit board can have a viewing aperture enabling viewing of at least one of a set of functional links connected to the at least one surge arrester in the housing when the housing is sealed.

Each of the at least one contactless temperature sensor can be an IR sensor.

Each of the at least one IR sensor can be positioned closer to an end of an adjacent one of the at least one surge arrester that is connected to ground.

A field of vision of each of the at least one IR sensor can be substantially occupied by an adjacent one of the at least one surge arrester.

The device can further comprise a pressure sensor positioned within the interior space to measure the pressure therein, the pressure sensor being coupled to the at least one controller to communicate pressure data to the at least one controller or forming part of the at least one controller.

The device can further comprise a humidity sensor positioned within the interior space to measure the humidity therein, the humidity sensor being coupled to the at least one controller to communicate humidity data to the at least one controller or forming part of the at least one controller.

The at least one surge arrester can comprise at least two surge arresters.

The at least one controller can be configured to compare the temperature data for a first of the at least two surge arresters to the temperature data for at least a second of the at least two surge arresters.

The device can further comprise an ambient temperature sensor positioned within the interior space to measure an ambient temperature therein, and in communication with the at least one controller to communicate ambient temperature data to the at least one controller or forming part of the at least one controller.

The at least one controller can be configured to compare the temperature data for a first of the at least one surge arrester to the ambient temperature data.

The at least one surge arrester can comprise at least two surge arresters.

The at least one controller can be configured to compare the temperature data for a first of the at least two surge arresters to the temperature data for at least a second of the at least two surge arresters.

The at least one controller can be configured to compare the temperature data for the first of the at least two surge arresters to the temperature data for other of the at least two surge arresters and the ambient temperature data.

The at least one controller can be configured to monitor the temperature data to determine when at least one of the at least one surge arrester reaches a threshold temperature.

The at least one controller can be configured to monitor the temperature data to determine when at least one of the at least one surge arrester exceeds a threshold temperature for a defined period of time.

The at least one controller can be powered by a power source that is self-contained and one of in the interior space and positioned outside of the interior space.

The power source can be at least one battery.

The at least one controller can be configured to control the at least one contactless temperature sensor to determine when the at least one contactless temperature sensor measures the temperature of the at least one surge arrester and generate the temperature data therefrom.

The device can be a link box, the link box can include at least one internal electrical conductor positioned within the interior space, each of the at least one internal electrical conductor can either extend out of the interior space or be electrically connected to an external electrical conductor positioned outside of the interior space, and each of the at least one surge arrester can be a sheath voltage limiter that electrically connects a corresponding one of the at least one internal electrical conductor to a ground conductor.

Opening and resealing of the housing is inhibited.

Routine testing of the components of the link box can be performed without opening the housing.

In another aspect, there is provided a link box with health monitoring, comprising: a housing defining an interior space; at least one internal electrical conductor positioned within the interior space, each of the at least one internal electrical conductor either extending out of the interior space or being electrically connected to an external electrical conductor positioned outside of the interior space; and at least one pressure sensor positioned within the interior space to measure the pressure therein and generate pressure data therefrom, each of the at least one pressure sensor either communicating the pressure data to at least one controller to which the pressure sensor is coupled or forming part of the at least one controller.

The at least one controller can be configured to control the at least one pressure sensor to determine when the at least one pressure sensor measures the pressure in the interior space and generates the pressure data therefrom.

In a further aspect, there is provided a link box with health monitoring, comprising: a housing defining an interior space; at least one internal electrical conductor positioned within the interior space, each of the at least one internal electrical conductor either extending out of the interior space or being electrically connected to an external electrical conductor positioned outside of the interior space; and at least one humidity sensor positioned within the interior space to measure the humidity therein and generate humidity data therefrom, each of the at least one humidity sensor either communicating the humidity data to at least one controller to which the humidity sensor is coupled or forming part of the at least one controller.

The at least one controller can be configured to control the at least one humidity sensor to determine when the at least one humidity sensor measures the humidity within the interior space and generates the humidity data therefrom.

The at least one controller can be configured to generate an alert upon the humidity exceeding a threshold.

The at least one controller can be configured to generate an alert upon a rate of change in the humidity exceeding a threshold.

The at least one humidity sensor can measure relative humidity.

The at least one controller can be configured to calculate the absolute humidity from the humidity data and generate an alert if the absolute humidity exceeds a threshold.

The at least one controller can be configured to calculate the absolute humidity from the humidity data and generate an alert if the rate of increase of the absolute humidity exceeds a threshold.

In yet another aspect, there is provided a device with health monitoring, comprising: a housing defining an interior space; at least one component positioned in the interior space; at least one contactless temperature sensor positioned to contactlessly measure a temperature of the at least one component and generate temperature data therefrom; and at least one controller connected to the at least one contactless temperature sensor and configured to receive the temperature data.

The at least one controller can be provided on at least one circuit board.

At least a portion of the housing can be at least partially transparent, and at least one of the at least one circuit board can have a viewing aperture enabling viewing of at least one of a set of functional links connected to the at least one component in the housing when the housing is sealed.

Each of the at least one contactless temperature sensor can be an IR sensor.

Each of the at least one IR sensor can be positioned closer to an end of an adjacent one of the at least one component that is connected to ground.

A field of vision of each of the at least one IR sensor can be substantially occupied by an adjacent one of the at least one component.

The device can further comprise a pressure sensor positioned within the interior space to measure the pressure therein, the pressure sensor being coupled to the at least one controller to communicate pressure data to the at least one controller or forming part of the at least one controller.

The device can further comprise a humidity sensor positioned within the interior space to measure the humidity therein, the humidity sensor being connected to the at least one controller to communicate humidity data to the at least one controller or forming part of the at least one controller.

The at least one component can comprise at least two components.

The at least one controller can be configured to compare the temperature data for a first of the at least two components to the temperature data for at least a second of the at least two components.

The device can further comprise an ambient temperature sensor positioned within the interior space to measure an ambient temperature therein, and in communication with the at least one controller to communicate ambient temperature data to the at least one controller or forming part of the at least one controller.

The at least one controller can be configured to compare the temperature data for a first of the at least one component to the ambient temperature data.

The at least one component can comprise at least two components.

The at least one controller can be configured to compare the temperature data for a first of the at least two components to the temperature data for at least a second of the at least two components.

The at least one controller can be configured to compare the temperature data for the first of the at least two components to the temperature data for other of the at least two components and the ambient temperature data.

The at least one controller can be configured to monitor the temperature data to determine when at least one of the at least one component reaches a threshold temperature.

The at least one controller can be configured to monitor the temperature data to determine when at least one of the at least one component exceeds a threshold temperature for a defined period of time.

The at least one controller can be powered by a power source that is self-contained and one of in the interior space and positioned outside of the interior space.

The power source can be at least one battery.

The at least one controller can be configured to control the at least one contactless temperature sensor to determine when the at least one contactless temperature sensor measures the temperature of the at least one component and generate the temperature data therefrom.

The device can be a link box, the link box can include at least one internal electrical conductor positioned within the interior space, each of the at least one internal electrical conductor can either extend out of the interior space or be electrically connected to an external electrical conductor positioned outside of the interior space, and each of the at least one component can be a sheath voltage limiter that electrically connects a corresponding one of the at least one internal electrical conductor to a ground conductor.

Opening and resealing of the housing is inhibited.

Routine testing of the components of the link box can be performed without opening the housing.

BRIEF DESCRIPTION OF THE DRAWINGS

For a better understanding of the embodiment(s) described herein and to show more clearly how the embodiment(s) may be carried into effect, reference will now be made, by way of example only, to the accompanying drawings in which:

FIG. 4 is a schematic diagram of elements of a monitoring system for a link box similar to that of FIG. 3, wherein the one or more batteries are positioned in a separate compartment within the link box.

Figure 1:
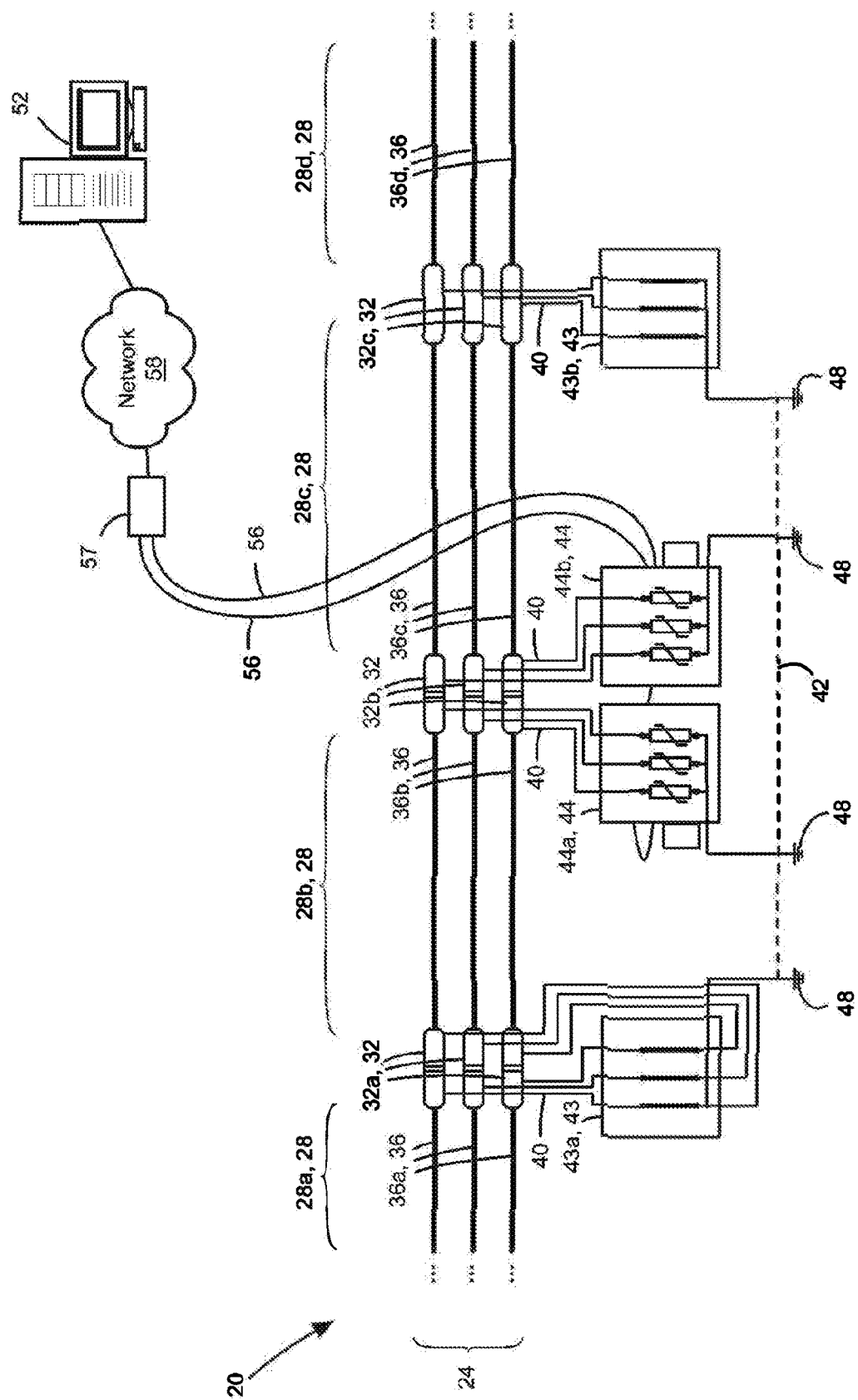
FIG. 1 is a schematic diagram of a portion of a power cable system in accordance with an embodiment thereof.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Any module, unit, component, server, computer, terminal engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

FIG. 1 is a schematic diagram of a portion of a three-phase power cable system 20 in accordance with an embodiment. The power cable system 20 includes three power transmission lines (typically one line per phase) 24. Each of the power transmission lines 24 is segmented into cable sections at cable joints. In the illustrated portion of the power cable system 20, each of the power transmission lines 24 is segmented into cable sections 28a to 28d (collectively alternatively referred to herein as cable sections 28) at cable joints 32a to 32c (alternatively, collectively hereinafter referred to as cable joints 32). The cable joints 32 also divide the cable sheaths of the power transmission lines 24 into sheath sections 36a to 36d (collectively alternatively referred to herein as sheath sections 36). These sheath sections 36 are typically about 650 meters on average in length, but can typically range in length from less than 100 m to over 1200 m depending on the installation conditions.

The sheath sections 36b and 36c of the power transmission lines 24 are single-point bonded. In single-point bonding, the sheaths of the three cable phases are connected to ground at one point in each section. Insulated bonding leads 40 are used at the cable joints 32 to bond the sheath sections 36b, 36c to ground through surge arresters in the form of sheath voltage limiters ("SVLs"), which act as an open circuit under normal conditions so that no current flows in the sheath. The cable joints 32a, 32b contain a sectionalized insulator to interrupt the cable sheath continuity between the sheath sections 36a to 36c. In this single point bonding configuration, a ground continuity conductor 42 is usually required to provide a closely coupled return path for zero sequence fault current.

The sheath sections 36b, 36c are grounded via four link boxes 43a, 43b, 44a, and 44b. The link boxes 43a and 43b are grounding link boxes used to connect the sheath sections 36 directly to ground. The link boxes 44a and 44b are used at the cable joint 32b to provide an open circuit point for the sheath sections 36b and 36c and thus eliminate the flow of sheath current under normal conditions while incorporating SVLs to limit transient voltages to sustainable levels. Further, ground connections 48 are coupled either to the bonding leads 40 or to the SVLs inside the link boxes 43a to 44b effectively grounding the bonding leads 40 or SVLs to provide a path to ground for normal or transient current to flow.

In other embodiments, the link boxes can have metal housings that are grounded via ground connections for safety reasons.

Other types of link boxes can be used at other joints of the power cable system 20. For example, in sheath cross bonding, bonding leads at a cable joint are used to interconnect sheath sections in link boxes in a specific sequence to neutralize the currents that would otherwise exist therealong had the sheath been continuous across the joint. When the phase currents are balanced and the cable sheath connection is rotated from one phase conductor of the cable circuit to another along the length of the circuit, the induced voltages in the cable shields cancel resulting in relatively low levels of induced sheath voltage and very little circulating current. As the sheaths provide the ground return path, there is no requirement for a separate ground continuity conductor and this can be eliminated.

The link boxes 44a and 44b housing SVLs (alternatively, collectively referred to hereinafter as SVL link boxes 44) include sensors that are used to register data about the functional condition of the SVL link boxes 44. The registered data is then communicated to a remote computing device. In this embodiment, the remote computing device is a computer 52, but can be any suitable computing device for presenting health data to a user for the link boxes 44. The communications are conducted via fiber optic cables 56 that are connected to an intermediate communications node 57 that is in communication with the computer 52 via a data communications network 58. The data communications network 58 can include both wired and/or wireless communication links. It will be understood that various intermediate communication nodes may be present although not explicitly shown.

It is envisioned that the link boxes 43a and 43b can also include similar monitoring equipment.

The SVL link boxes 44 in this embodiment will now be described in greater detail with reference to FIGS. 2A to 2D. In this embodiment, the SVL link box 44 is designed to be configured once and sealed without the need to repetitively reopen the link box for inspection or to perform testing, but, in other embodiments, it can be designed to be opened for periodic inspection and testing. Further, monitoring of the SVL link box 44 and sheath-bonding status is performed automatically and the SVL link box 44 and sheath-bonding status is communicated to a remote computing device to enable remote monitoring of the link box. In this manner, some issues can be proactively identified, reducing the need to intermittently physically inspect the SVL link box 44. Various other advantages will be described and/or become apparent from the following discussion.

Figure 2A:
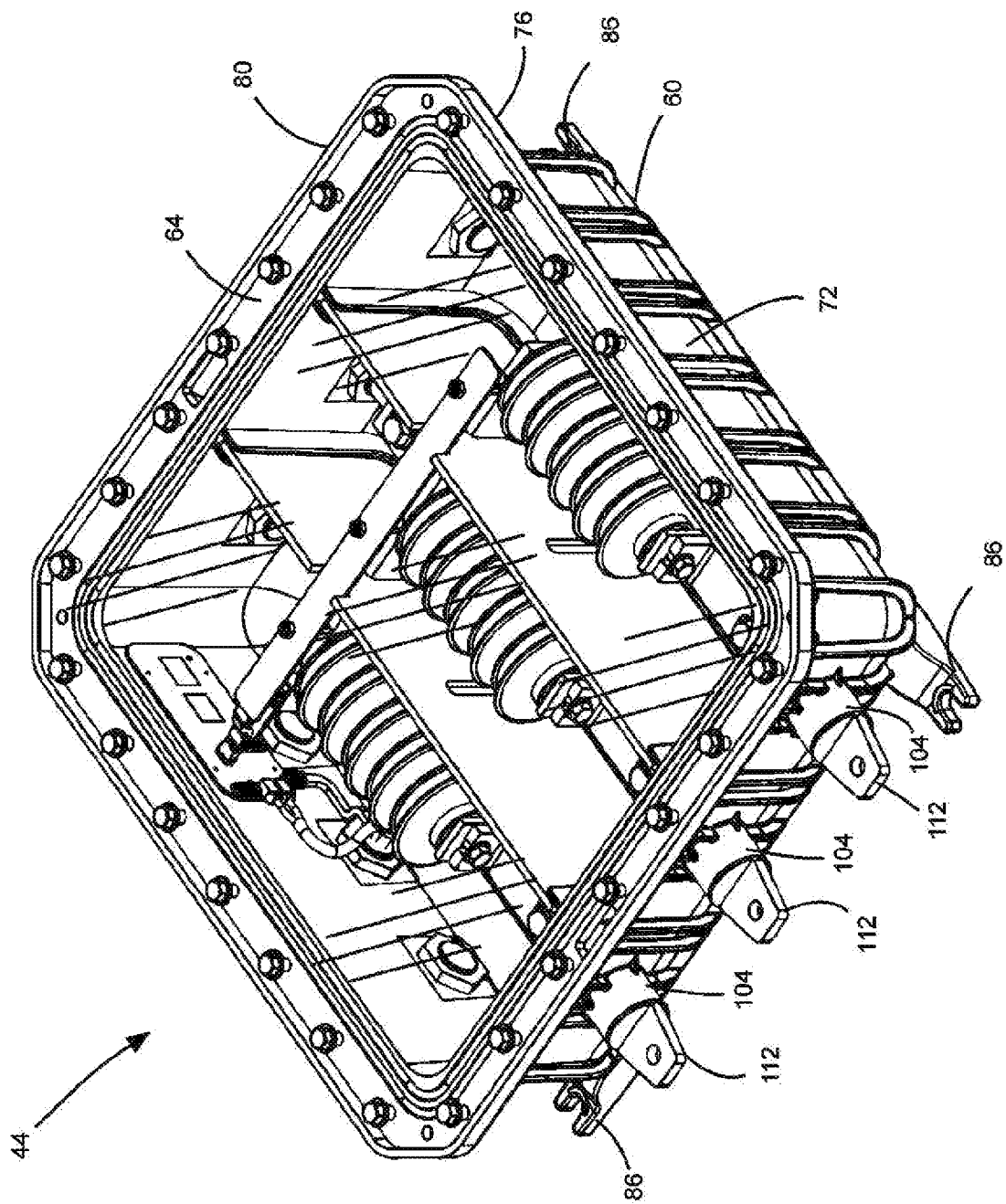
FIG. 2A is a top perspective view of the link box of FIG. 1 having a housing base and a cover defining an enclosure.
Figure 2B:
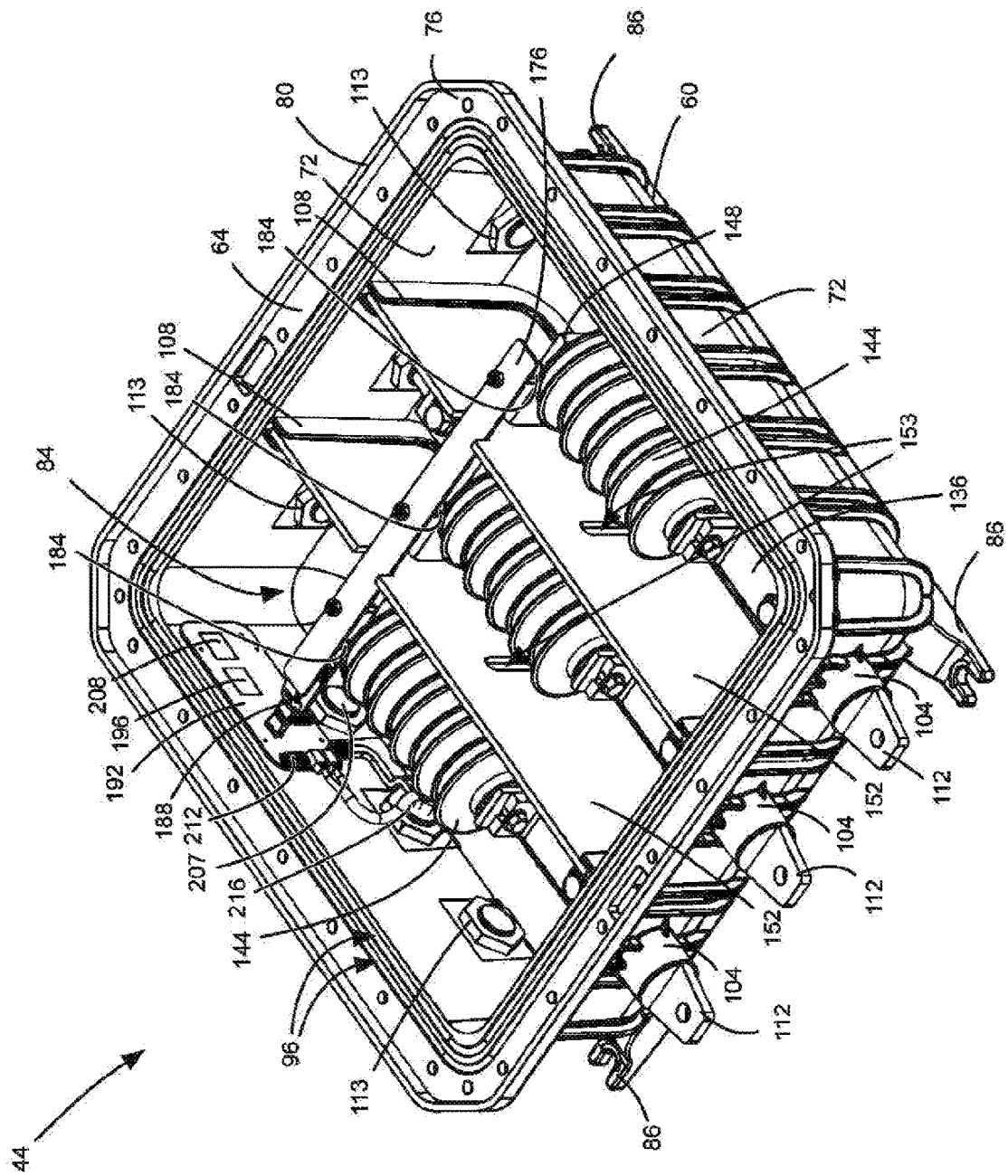
FIG. 2B is a top perspective view of the link box of FIG. 2A after removal of the cover.
Figure 2C:
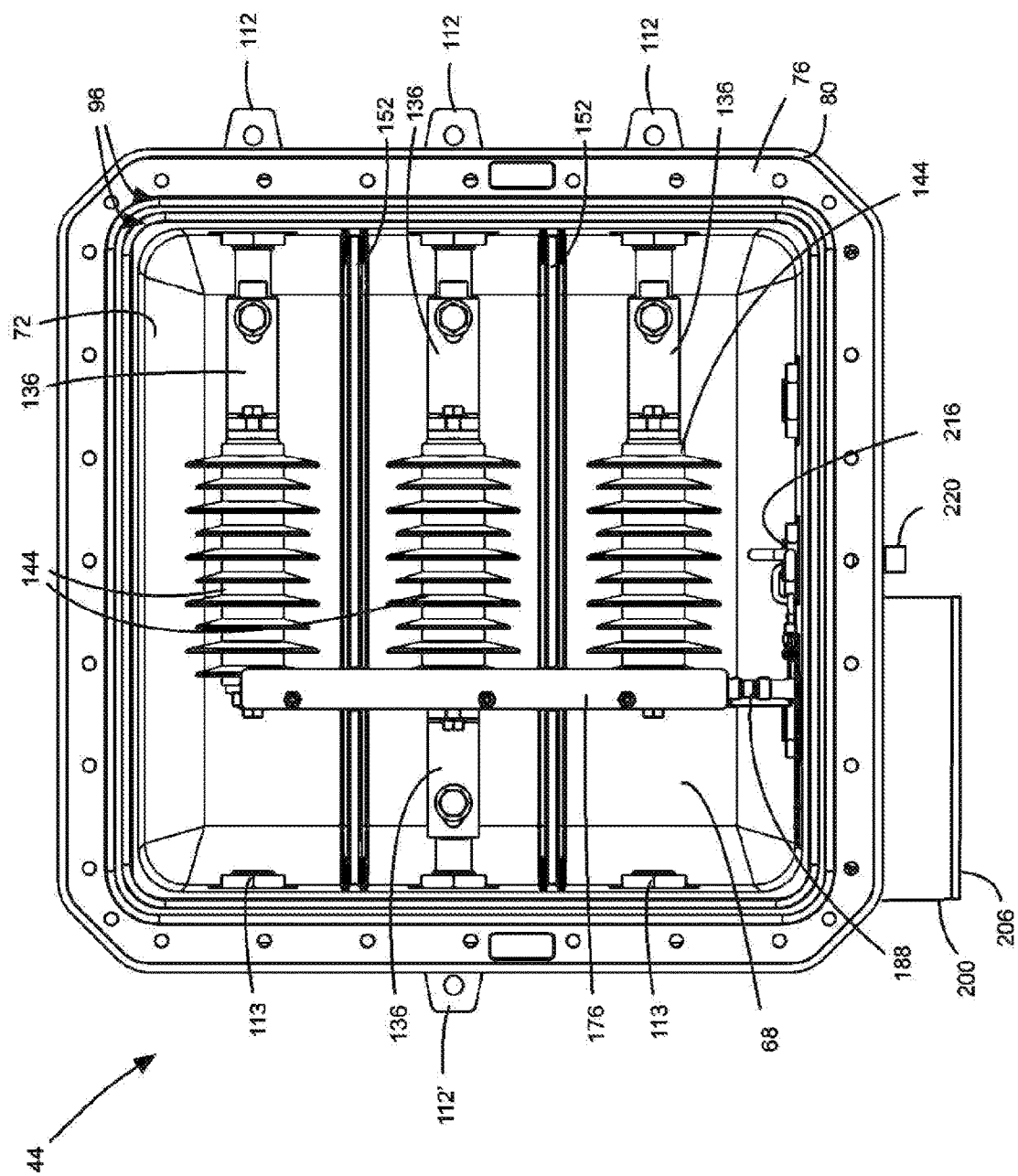
FIG. 2C is a top plan view of the link box of FIG. 2B.
Figure 2D:
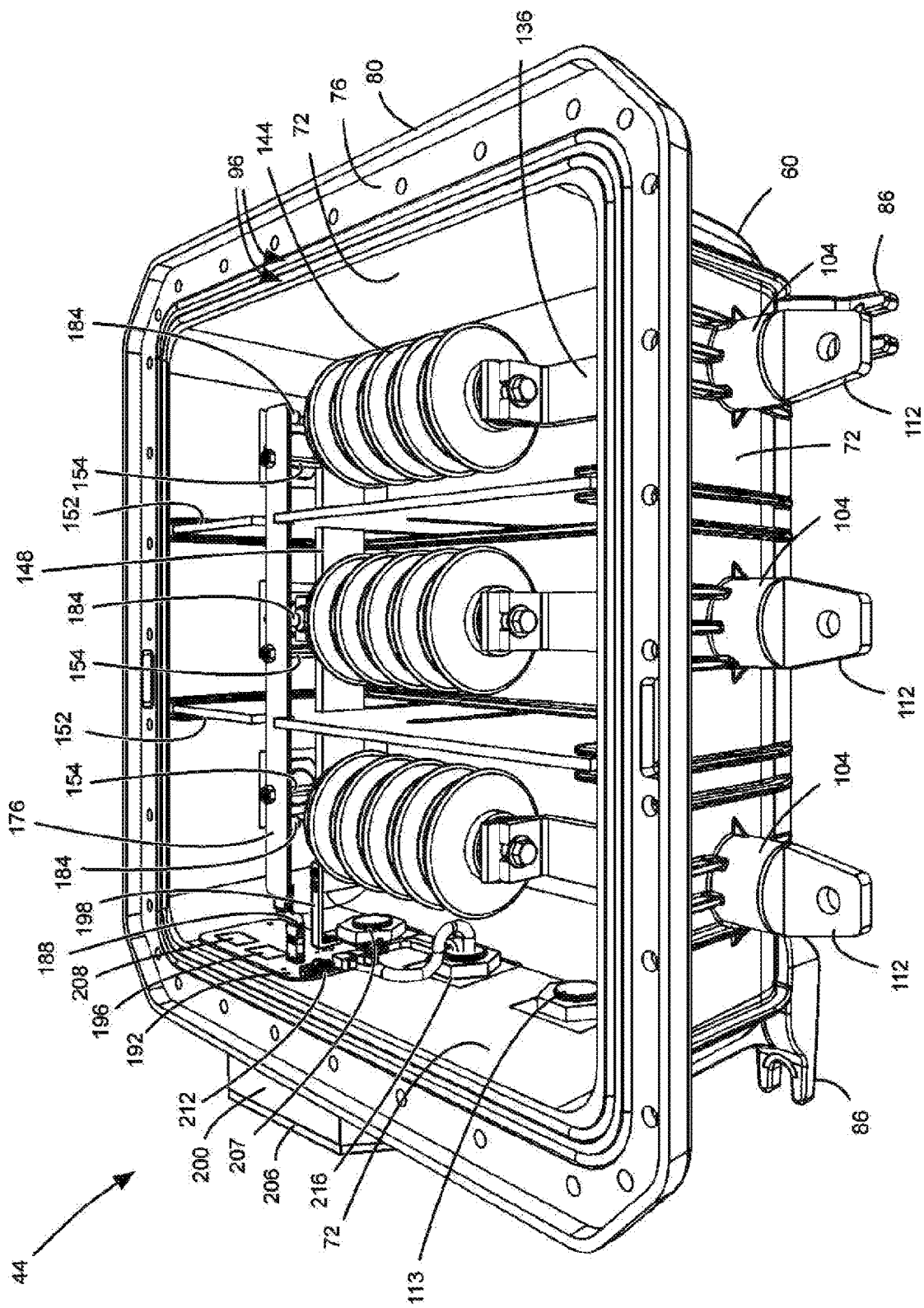
FIG. 2D is a top perspective view of the link box of FIG. 2B.

The SVL link box 44 has a housing primarily made of two housing portions, namely a housing base 60 and a housing cover 64 that seal together to form an enclosure, as shown in FIG. 2A. In FIGS. 2B to 2D, the housing base 60 is shown having a floor 68 from which four sidewalls 72 extend upwardly. A flange 76 extends outwardly from a top edge of the sidewalls 72. A flange lip 80 extends upwardly around the flange 76. The housing cover 64 is dimensioned to rest atop of the flange 76 and fit within the flange lip 80. The flange 76 provides an abutment surface urged into contact with a peripheral abutment surface of the housing cover 64 when the housing base 60 and the housing cover 64 are sealed together. When the housing cover 64 is positioned atop of the housing base 60, the housing base 60 and the housing cover 64 seal to define an interior space 84. A set of four mounting feet 86 extend laterally from the floor 68 to enable mounting of the SVL link box 44 in a location, such as, for example, a vertical or a horizontal surface. In this example embodiment, the housing base 60 is injection molded from a material that is at least partially a polymer and the housing cover 64 is a clear plastic. In other embodiments, the housing cover can be opaque or the link box can be a traditional link box constructed of stainless steel or another suitable metal.

The dimensions of the SVL link box 44 were selected to contain the internal components including links, busbars, connectors, and SVLs for a range of desired voltage ratings and different internal configurations, while still being sized to fit through a standard manhole opening. In addition, the SVL link box 44 is also dimensioned to house a sensor system as is described herein. Additional or other sizes can be selected depending upon the application's requirements.

Referring again to FIG. 2A, the housing cover 64 of the SVL link box 44 is generally planar, but, in other embodiments, can extend away from the housing base 60 to provide an expanded interior space 84 defined by the enclosure. Preferably, at least a portion of the housing cover 64 is at least partially transparent. In the illustrated embodiment, the entire housing cover 64 is made of a material that is at least partially transparent, such as a clear polycarbonate, facilitating the manufacture of its expanded form. In this way, the field of view of the internals of the SVL link box 44 is improved.

The housing cover 64 is securable to the housing base 60 via a set of bolts that are inserted through bolt holes in the flange 76 and the housing cover 64. A pair of annular grooves 96 is formed in the upper surface of the flange 76 in which large o-rings are positioned, although other arrangements to seal the housing against the ingress of water can be employed. As the housing cover 64 is made from a single piece of at least partially transparent material, visual inspections of the contents of the SVL link box 44 can be performed without opening the SVL link box 44.

As shown in FIGS. 2B to 2D, the SVL link box 44 has nine connector ports extending through connector support structures in the form of connector sleeves 104. The connector ports can be employed for several purposes. The SVL link box 44 has three connector ports on each of two opposing side walls 72. As illustrated, the three connector ports on one side are configured to accommodate three cable phases entering the housing, and a ground connector passes through the central connector port on the opposite side. In addition, a third side wall 72 of the housing is configured with three connector ports. One connector port is used for monitoring functionality, and two connector ports are spare ports.

A set of separator supports 108 is formed on an interior surface of two opposing sidewalls 72 as shown in FIG. 2B. The separator supports 108 extend parallel to one another from the curved section up towards the flange 76 and define separator channels.

Referring again to FIGS. 2B to 2D, the housing base 60 is shown with a set of four connectors 112, 112' sealed in the connector sleeves 104 and connected to a set of functional links. Three of the connectors 112 are configured to be connected to sheath-bonding leads 40, and the connector 112' shown in FIG. 2C is configured to be connected to ground. The functional links include connector links 136, each coupled to one of the three connectors 112, 112' via a bolt. The connector links may be covered with a dielectric coating across most of their surface area apart from where contact is made with the connectors 112, 112'. The dielectric coating reduces the probability of arcs between the connector links and other components having a different voltage potential. The unused connector ports are sealingly fitted with sealing plugs 113 to prevent the ingress of water.

An SVL 144 is also secured to each of the connector links 136 connected to the connectors 112. The SVLs 144 connect to a crossbar 148 that is coupled to the connector 112' serving as a ground connector. In other embodiments, the sheath-bonding leads can enter the housing through cable glands and connect directly to the connector links or SVLs.

A planar phase separator 152 is inserted when required into opposing separator channels formed by the separator supports 108 between the functional links for each phase. The phase separators 152 act as an electrical separation structure interposed between at least one phase and at least another phase in the interior space 84 to thereby inhibit initiation of an arc between exposed components of different phases. They are made from a material that has high electrical insulation properties, such as, for example, glass polyester or any other suitably non-conductive material. Each phase separator 152 can have one or more slots, openings, or other discontinuities (alternatively, collectively referred to hereinafter as "apertures") through which the SVL grounding crossbar 148 and other functional links can be installed. Apertures can include, but are not limited to, slots, openings, discontinuities, and gaps. Multiple apertures can be provided in each phase separator 152 to facilitate multiple configurations of the link box and resulting locations of the crossbar 148 and links. Unoccupied apertures 153 are shown in the phase separators 152 in FIG. 2B. The phase separators 152 effectively increase the voltage rating of the SVL link box 144.

The SVL link box 44 includes a monitoring system for monitoring various conditions within the SVL link box 44, including the condition of the SVLs 144. The monitoring system then communicates this health data to a remote computing device, such as the computer 52. This enables at least near real-time monitoring of the condition of the SVL link box 44, thereby reducing the frequency with which workers need to inspect the SVL link box 44.

To this end, the monitoring system includes a sensor system having a set of sensors installed within the interior space 84 of the SVL link box 44. The sensor system is powered and controlled from conductively coupled circuitry residing within the link box 44 and/or in a separate enclosure.

Now, with reference to FIG. 2D, three standoff insulators 154 are shown attached to the ground crossbar 148. An IR sensor circuit board 176 is positioned atop of and in contact with the standoff insulators 154. The IR sensor circuit board 176 is narrow so as to minimize obstruction of the view of the SVLs 144 and functional links of the SVL link box 144 through the clear cover 64. In other embodiments, the shape and dimensions of the circuit board can be varied to provide greater or lesser visibility, strength, and/or space for additional components.

Three infrared ("IR") sensors 184 are positioned on a surface of the IR sensor circuit board 176 that faces the functional links when the IR sensor circuit board 176 is positioned in the SVL link box 44. Each of the three IR sensors 184 is positioned along the IR sensor circuit board 176 to target a corresponding SVL 144 so that the SVL 144 is within its field of vision (for example, twelve degrees). This enables the IR sensors 184 to contactlessly measure the surface temperature of the SVLs 144 and generate temperature data therefrom. Preferably each IR sensor 184 is selected and is close enough to an adjacent one of the SVLs 144 so that the field of vision of the IR sensor 184 is substantially or fully occupied by the surface of the adjacent SVL 144. Further, preferably, each IR sensor 184 is positioned closer to an end of the adjacent SVL 144 that is connected to ground, and is sufficiently far from the other end of the SVL 144 that is connected to an ungrounded link and/or conductor so that the voltage withstand rating of the SVL link box 144 is not reduced by the addition of the IR sensor circuit board 176, which is grounded. As the IR sensors 184 are relatively small, even if they are placed above the SVLs 144, they do not significantly impede visual inspection of the SVLs 144. These IR sensors 184 use very low power and can be embedded directly into the printed circuit board 176.

The IR sensor circuit board 176 is connected by a ribbon cable 188 to controller circuit board 192. An integrated circuit 196 is mounted on a surface of the controller circuit board 192 and includes temperature, pressure, and humidity sensors to monitor and register temperature, pressure, and humidity in the enclosure. The integrated circuit 196 forms part of the sensor system that allows the monitoring system to notify the operator if there is a condition in the SVL link box 144 that is abnormal and may require attention such as a leak, temperature increase, or build-up of gas pressure. In other embodiments, the integrated circuit can include additional sensors such as those that detect specific gases such as volatile organic compounds. The enclosure temperature is also used in analyzing the SVL temperature data collected via the IR sensors 184.

The enclosure monitoring integrated circuit 196 can be placed anywhere on the controller circuit board 192, the IR sensor circuit board 176, or another circuit board, but preferably is spaced some distance from the SVLs 144 and other heat-generating components so that the temperature measured by the integrated circuit 196 is representative of the average ambient temperature of the enclosure and not the localized temperature due to its proximity to any specific SVL 144 or other heat source within the enclosure. In this manner, the operating temperatures of the SVLs 144 can be compared to the enclosure temperature and to the temperature of the other SVLs 144 as a group or individually.

In the particular embodiment the link box is configured to facilitate testing of the components in the link box without being opened. As a result, it is less important to facilitate opening and re-sealing of the link box in the field in order to preserve the integrity of the water and dust seal of the link box. The link box can be sealed by a manufacturer to the requirements of a specific standard, such as IP67. In fact, its construction can, in some circumstances, inhibit its opening and re-sealing to maintain this rating of the link box, such as by using fasteners that inhibit removal. This can inhibit temperature measurement of the individual components in the link box. In other scenarios, however, the link box can be configured to be readily openable and re-sealable.

A ground support bar 198 electrically and mechanically connects the controller circuit board 192 to the ground crossbar 148 within the SVL link box 44. This ground support bar 198 provides a ground connection to the controller circuit board 192 so that the controller circuit board 192 ground is at the same ground potential as the SVL link box 44. The ground support bar 198 also provides a mounting point for the controller circuit board 192 to secure it in place at some distance away from the sidewall 72 of the SVL link box 44, which can flex under external or internal pressure and move relative to the internal components of the SVL link box 44. In other embodiments, the ground support bar 198 could be replaced with an insulator to provide mounting support to the controller circuit board 192, or the controller circuit board 192 could be fixed to the sidewall 72, and a separate preferably flexible ground wire could be run between the controller circuit board 192 and a ground point in the SVL link box 44. The ribbon cable 188 includes ground, power and data connections between the controller circuit board 192 and the IR sensor circuit board 176.

Figure 3:
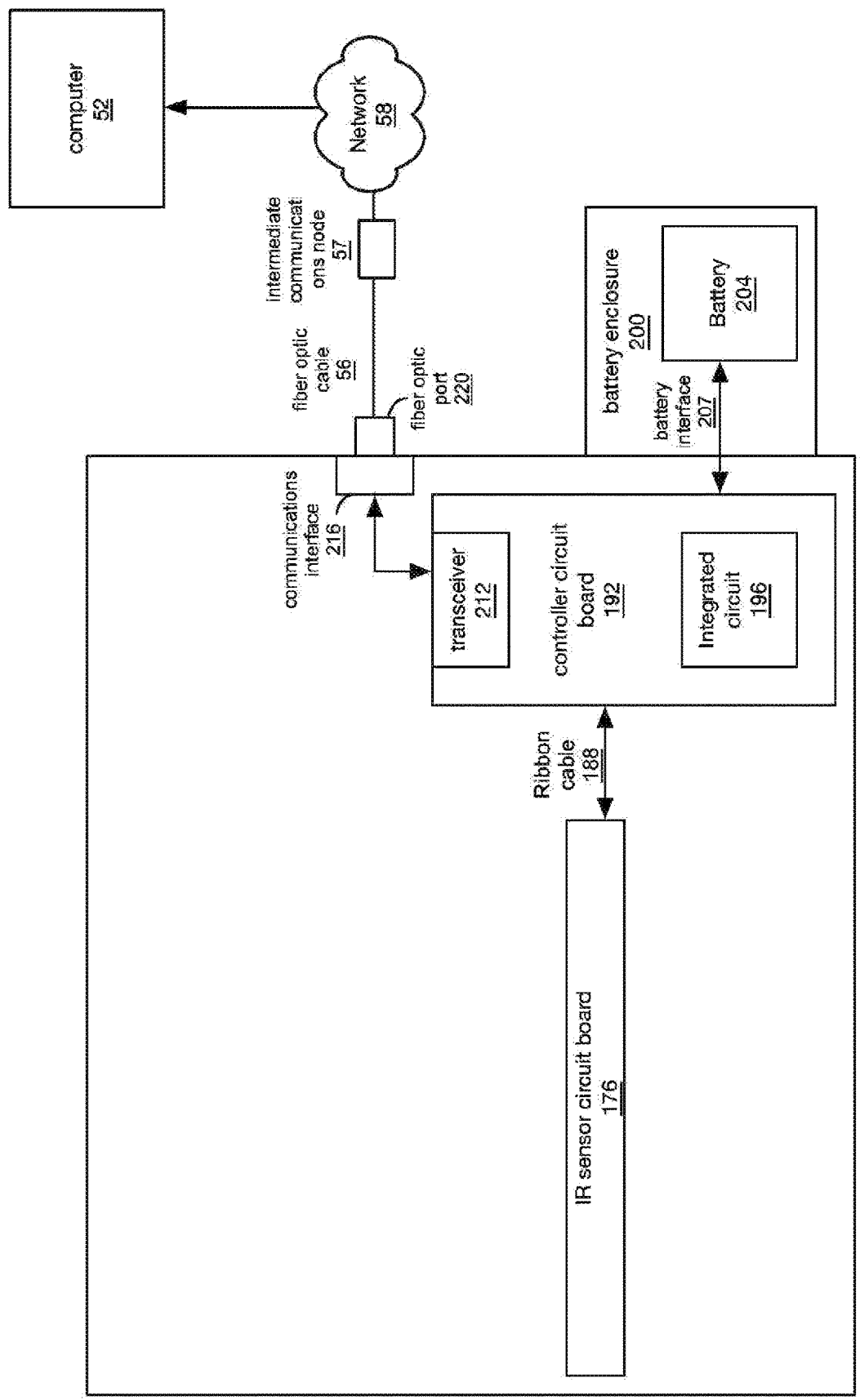
FIG. 3 is a schematic diagram of elements of a monitoring system for the link box of FIGS. 1 to 2D.

Now with reference to FIGS. 2C to 3, a separate watertight battery compartment 200 is shown coupled to the housing base 64 for housing one or more batteries 204 that can be changed via a battery compartment cover 206 without removing the housing cover 64 of the link box 44 from the housing base 60. The one or more batteries 204 provide a self-contained power source to the remote monitoring system of the SVL link box 44. The battery compartment 200 can be formed integrally with the housing base 60 or separately from the housing base 60 and positioned adjacent to or some distance from the housing base 60. In the illustrated embodiment, the battery compartment 200 is coupled to the housing base 60, and power and communications between the one or more batteries 204 and the controller circuit board 196 are transmitted through a battery interface 207 that is sealingly fitted into one of the ports of the SVL link box 44. Power is then transmitted by the controller circuit board 192 to the IR sensor circuit board 176 to power the IR sensors 184. The battery interface 207 is watertight-sealed with the port of the housing base 60 to prevent the ingress of water or other substances, such as battery acid in the case of a malfunctioning battery 204. In other embodiments, the battery interface 207 can be located in the housing cover 64, multiple ports could be used, or the connections could be made through bulkhead penetration seals or connectors embedded in the wall of the SVL link box 144 itself. In an alternative embodiment, the health monitoring components in the SVL link box 144 can be powered by one or more batteries that are positioned in the SVL link box 144, preferably in a separate contained compartment.

Also positioned on the controller circuit board 192 is a controller 208 powered by the one or more batteries 204. The controller 208 is any type of controller enabling sensor data to be received from the IR sensors 184 and the integrated circuit 196, and communicated to the computer 52 via a transceiver 212. In other embodiments, two or more controllers can be employed to provide the functionality of the single controller 208. A communications interface 216 sealingly fitted in a port of the SVL link box 44 is coupled to the transceiver 212 and to the fiber optic cable 56 outside of the SVL link box 44 via the fiber optic port 220. The communications interface 216 is watertight sealed with the housing base 60 to prevent the ingress of water and other substances. In other embodiments, the communications interface 216 can be located in the housing cover 64, multiple communications interfaces can be used, or the connections could be made through bulkhead penetration seals or connectors embedded in the sidewall 72 of the SVL link box 44. The fiber optic port 220 is also sealable with the fiber optic cable 56 to prevent the ingress of any matter that can interfere with data transmissions. As previously discussed, the fiber optic cable 56 is connected to the intermediate communications node 57 that, in turn, is connected to the computer 52 via the data communications network 58.

The controller 208 can be configured to control the IR sensors 184 and the sensors of the integrated circuit 196 either individually or as a set to thereby determine when the IR sensors 184 measure (i.e., sample) the temperature of the SVLs 144 and generate the temperature data therefrom, and when the sensors of the integrated circuit 196 measure (i.e., sample) the ambient temperature, pressure, and humidity in the interior space 84 and generate the temperature, pressure, and humidity data therefrom.

The controller 208 is configured to communicate sensor data reported by the IR sensor circuit board 176 and the integrated circuit 196 via the transceiver 212 to the computer 52 via the fiber optic cable 56. The data sampling schedule is managed by the controller 208, which controls when and for how long each of the IR sensors 184 and the integrated circuit 196 are on and active so that the energy consumption of the monitoring system can minimized. The computer 52 can also send instructions to the controller 208 to change the data sampling schedule, sample data at an unscheduled time, or change other control parameters.

In an alternative embodiment, sensor data may be communicated via optical communications through an at least partially transparent portion of the housing of the SVL link box 44 to another controller situated outside the SVL link box 44 to transmit to the computer 52.

The monitoring system of the SVL link box 44 is powered by the one or more batteries 204 alone so that it can be used in various sheath-bonding link box designs with a range of sheath voltage and current levels. Preferably, the one or more batteries 204 can sufficiently power the monitoring system components for a period spanning between routine maintenance de-energizations of the power cable system 20, which is typically about 3 to 5 years. Accordingly, the monitoring system is designed to have very lower power consumption. In an alternative embodiment, the SVL link box 44 can also draw from another source of power, such as a service lateral from a utilization voltage transformer or harvested power, if available, in order to prolong the life of the one or more batteries 204 or to operate in more power intensive modes allowing, for example, more frequent sampling and/or transmission of data.

As the batteries 204 are in a separate enclosure from the main enclosure of the SVL link box 44 defined by the housing base 60 and the housing cover 64, the one or more batteries 204 can be serviced without opening the link box 44.

FIG. 4 is a schematic diagram of a link box in accordance with another embodiment, wherein the one or more batteries 204 are positioned within the link box with a battery enclosure 240 that isolates the one or more batteries 204 from the functional components of the link box. The one or more batteries 204 are connected to the controller circuit board 192 via a battery interface 244.

The controller 208 receives the sensor data that includes the temperature data for each SVL 144 from the IR sensors 184, and ambient temperature data, pressure data, and humidity data from the integrated circuit 196. The controller 208 compares the temperature of each SVL 144 to the temperature of the other SVLs 144 and/or to the ambient temperature of the enclosure to detect when an SVL 144 is operating outside its normal temperature range or exhibiting signs of thermal instability. If the temperature rises beyond a defined threshold or remains above a defined threshold for a defined period of time, then the controller 208 communicates an alert to the computer 52 so that an operator of the power cable system 20 is notified, giving them time to act as and when appropriate, before the SVL 144 fails entirely and is no longer protecting the power cable system 20.

The controller 208 can process the sensor data using a set of criteria such as thresholds for humidity, pressure, and temperature or equations and algorithms to compute other useful engineering information and can notify the computer 52 when one or more of the criteria is met. The criteria can be predefined or set by the controller 208 based on historic operating data.

In one example, humidity sensed by the integrated circuit 196 can be relative humidity and the controller 208 can use the relative humidity data and the ambient temperature data to calculate absolute humidity (grams of water in the SVL link box 44 per unit volume). If the computed absolute humidity increases to a certain level (i.e., a threshold) or at a certain rate, the controller 208 can generate a notification that the SVL link box 44 may be leaking. If the computer 52 loses communication from the controller 208 of the SVL link box 44 and the computer 52 had recently received a notification from the controller 208 of a suspected leak, the computer 52 may be configured to identify the SVL link box 44 as possibly having suffered water damage.

In another example, if there was an SVL high temperature notification reported by the controller 208 before the computer 52 lost communication with the controller 208 of the SVL link box 44, then the computer 52 can be configured to infer that a catastrophic failure of the SVL link box 44 could have occurred.

In an alternative embodiment, the controller 208 can pass along some or all of the sensor data directly to the computer 52 to enable an application executing on the computer 52 to determine whether an alert criteria has been triggered and/or retain the data for subsequent analysis, historical reference or to serve as an event log. In another alternative embodiment, the computer 52 can perform the analysis and can then transmit alerts and other data to one or more computing devices, such as other desktop computers, mobile devices, etc.

In some embodiments, power can be harvested from the connectors 112 coupled to the bonding leads 40, or the functional links coupled thereto, and used to charge the batteries 204. In another embodiment, the harvested power can be used to power the controller, by itself or as a supplement to the power from the batteries.

In further embodiments, the controller 180 may communicate the sensor data wirelessly to the remote computer via radio frequency, cellular, or other communication technology that does not require conductive coupling, such as optical communication through an at least partially transparent portion of the housing.

Figure 5B:
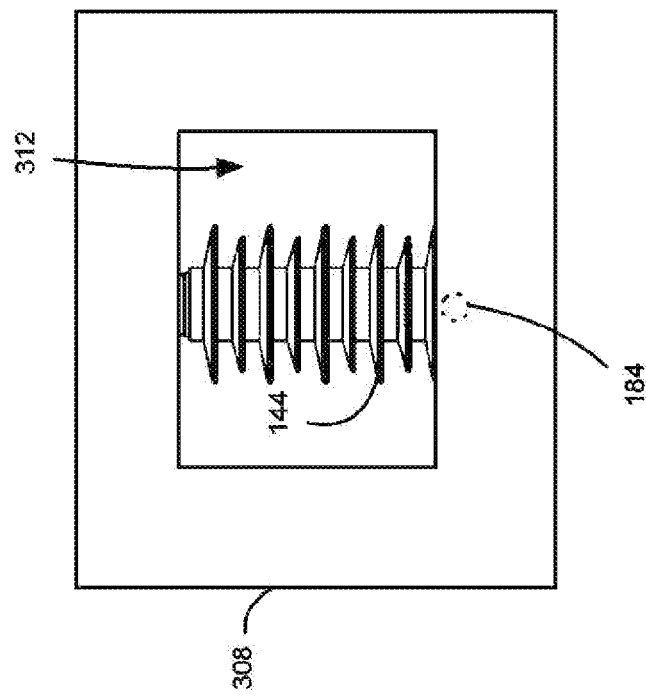
FIGS. 5A and 5B are schematic diagrams of circuit board configurations in accordance with various embodiments.
Figure 5A:
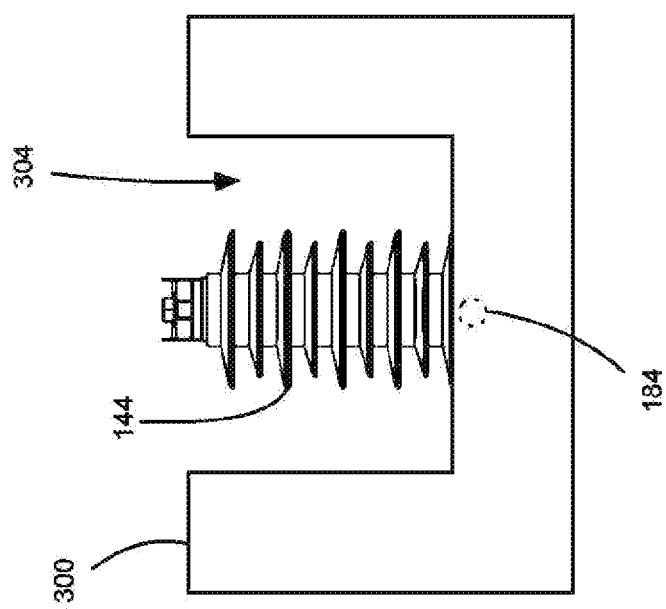

FIGS. 5A and 5B show IR sensor circuit boards in accordance with different embodiments having viewing apertures. In FIG. 5A, an IR sensor circuit board 300 is shown having generally rectangular outer dimensions, but having a viewing aperture 304 enabling visual inspection of an SVL 144 positioned thereunder. The IR sensor circuit board 300 includes an IR sensor 184 positioned to measure the temperature of the SVL 144. In FIG. 5B, an IR sensor circuit board 308 is also shown having generally rectangular outer dimensions, but has a viewing aperture 312 enabling visual inspection of an SVL 144 positioned thereunder. The IR sensor circuit board 300 includes an IR sensor 184 positioned to measure the temperature of the SVL 144. Other types, shapes, and dimensions of discontinuities can be employed to enable visual inspection of componentry in a link box without removal of the IR sensor circuit board. This design can be used with other types of circuit boards in link boxes as well to facilitate viewing of the components in a link box.

In other embodiments, some of the above features, such as the temperature, pressure and humidity monitoring, can be employed with other types of link boxes other than SVL link boxes.

While the above embodiments are described with respect to sheath-bonding link boxes, the same principles can be applied to other types of link boxes, and other types of devices having componentry to be monitored. Examples of such devices include, for example, transformer cabinets, high or medium voltage switchgear, and cathodic isolation enclosures.

The general techniques and structures described above can be used to monitor the health of other components in a device, such as, for example, resistors, circuit breakers, cables, and bus bars.

While the computer is shown as a single physical computer, it will be appreciated that the computer system can include two or more physical computers in communication with each other. Accordingly, while the embodiment shows the various components of the computer system residing on the same physical computer, those skilled in the art will appreciate that the components can reside on separate physical computers.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

LIST OF REFERENCE NUMERALS

20 power cable system
24 power transmission line
28, 28*a* to 28*d* cable section
32, 32*a* to 32*c* cable joint
36, 36*a* to 36*d* sheath section
40 bonding lead
42 ground continuity conductor
43, 43*a*, 43*b* grounding link box
44, 44*a*, 44*b* SVL link box
48 ground connection
52 computer
56 fiber optic cable
57 intermediate communications node
58 network
60 housing base
64 housing cover
68 floor
72 sidewall
76 flange
80 flange lip
84 interior space
86 mounting foot
96 annular groove
104 connector sleeve
108 separator support
112, 112' connector
113 sealing plug
144 SVL
148 crossbar
152 phase separator
153 aperture
154 standoff insulator
176 IR sensor circuit board
184 infrared sensor
188 ribbon cable
192 controller circuit board
196 integrated circuit
198 ground support bar
200 battery compartment
204 battery/batteries
206 battery compartment cover
207 battery interface
208 controller
212 transceiver
216 communications interface
220 fiber optic port
240 battery enclosure
244 battery interface
300 IR sensor circuit board
304 aperture
308 IR sensor circuit board
312 aperture

What is claimed is:

1. A device with health monitoring, comprising:
   a housing defining an interior space;
   at least one surge arrester positioned in the interior space;
   at least one contactless temperature sensor positioned to contactlessly measure a temperature of the at least one surge arrester and generate temperature data therefrom; and
   at least one controller connected to the at least one contactless temperature sensor and configured to receive the temperature data.

2. The device of claim 1, wherein the at least one controller is provided on at least one circuit board.

3. The device of claim 1, wherein each of the at least one contactless temperature sensor is an IR sensor.

4. The device of claim 1, further comprising a pressure sensor positioned within the interior space to measure the pressure therein, the pressure sensor being coupled to the at least one controller to communicate pressure data to the at least one controller.

5. The device of claim 1, further comprising a humidity sensor positioned within the interior space to measure the humidity therein, the humidity sensor being coupled to the at least one controller to communicate humidity data to the at least one controller.

6. The device of claim 1, wherein the at least one surge arrester comprises at least two surge arresters.

7. The device of claim 1, further comprising an ambient temperature sensor positioned within the interior space to measure an ambient temperature therein, and in communication with the at least one controller to communicate ambient temperature data to the at least one controller.

8. The device of claim 1, wherein the at least one controller is configured to monitor the temperature data to determine when at least one of the at least one surge arrester reaches a threshold temperature.

9. The device of claim 1, wherein the at least one controller is configured to monitor the temperature data to determine when at least one of the at least one surge arrester exceeds a threshold temperature for a defined period of time.

10. The device of claim 1, wherein the at least one controller is powered by a battery that is self-contained and is disposed inside or outside the interior space.

11. The device of claim 1, wherein the device is electrically connected to electric power lines; and wherein the at least one controller is energized by power harvested from the electric power lines.

12. The device of claim 1, wherein the at least one controller is configured to control the at least one contactless temperature sensor to determine when the at least one contactless temperature sensor measures the temperature of the at least one surge arrester and generates the temperature data therefrom.

13. The device of claim 2, wherein at least a portion of the housing is at least partially transparent, and wherein at least one of the at least one circuit board has a viewing aperture enabling viewing of at least one of a set of functional links connected to the at least one surge arrester in the housing when the housing is sealed.

14. The device of claim 3, wherein each of the at least one IR sensor is positioned closer to an end of an adjacent one of the at least one surge arrester that is connected to ground.

15. The device of claim 3, wherein a field of vision of each of the at least one IR sensor is substantially occupied by an adjacent one of the at least one surge arrester.

16. The device of claim 4, wherein the at least one controller is configured to control the pressure sensor to determine when the pressure sensor measures the pressure in the interior space and generates the pressure data therefrom.

17. The device of claim 5, wherein the at least one controller is configured to control the at least one humidity sensor to determine when the at least one humidity sensor measures the humidity within the interior space and generates the humidity data therefrom.

18. The device of claim 5, wherein the at least one controller is configured to generate an alert if the humidity exceeds a threshold.

19. The device of claim 5, wherein the at least one controller is configured to generate an alert upon a rate of change in the humidity exceeding a threshold.

20. The device of claim 5, wherein the at least one controller is configured to calculate the absolute humidity from the humidity data and generate an alert if the absolute humidity or rate of increase of the absolute humidity exceeds a threshold.

21. The device of claim 6, wherein the at least one controller is configured to compare the temperature data for a first of the at least two surge arresters to the temperature data for at least a second of the at least two surge arresters.

22. The device of claim 7, wherein the at least one controller is configured to compare the temperature data for a first of the at least one surge arresters to the ambient temperature data.

23. The device of claim 22, wherein the at least one surge arrester comprises at least two surge arresters.

24. The device of claim 23, wherein the at least one controller is configured to compare the temperature data for a first of the at least two surge arresters to the temperature data for at least a second of the at least two surge arresters.

25. The device of claim 23, wherein the at least one controller is configured to compare the temperature data for the first of the at least two surge arresters to the temperature data for other of the at least two surge arresters and the ambient temperature data.

26. A link box with health monitoring, comprising:
a housing defining an interior space;
at least one internal electrical conductor positioned within the interior space, each of the at least one internal electrical conductor either extending out of the interior space or being electrically connected to an external electrical conductor positioned outside of the interior space;
at least one sheath voltage limiter positioned in the interior space that electrically connects a corresponding one of the at least one of the at least one internal electrical conductor to a ground conductor;
at least one contactless temperature sensor positioned to contactlessly measure a temperature of the at least one sheath voltage limiter and generate temperature data therefrom, each temperature sensor communicating the temperature data to at least one controller; and
at least one environment parameter sensor positioned within the interior space to measure the at least one environment parameter therein and generate environmental condition data therefrom, each of the at least one environment parameter sensor communicating the environmental condition data to at least one controller.

27. A link box with health monitoring, comprising:
a housing defining an interior space;
at least one component positioned in the interior space;
at least one contactless temperature sensor positioned to contactlessly measure a temperature of the at least one component and generate temperature data therefrom; and
at least one controller connected to the at least one contactless temperature sensor and configured to receive the temperature data;
wherein the link box includes
at least one internal electrical conductor positioned within the interior space, each of the at least one internal electrical conductor either extending out of the interior space or being electrically connected to an external electrical conductor positioned outside of the interior space.

28. The device of claim 27, wherein the at least one component is a surge arrester, and wherein each of the at least one surge arrester is a sheath voltage limiter that electrically connects a corresponding one of the at least one of the at least one internal electrical conductor to a ground conductor.

29. The device of claim 27, wherein routine testing of elements within the link box can be performed without opening the housing.

* * * * *